(12) United States Patent
Petit et al.

(10) Patent No.: US 8,654,499 B2
(45) Date of Patent: Feb. 18, 2014

(54) PIPE CONNECTOR

(75) Inventors: David Petit, Bristol (GB); Anthony Bryant, Comhall (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/222,128

(22) Filed: Aug. 31, 2011

(65) Prior Publication Data

US 2012/0057267 A1 Mar. 8, 2012

(30) Foreign Application Priority Data

Sep. 6, 2010 (GB) .................................. 1014699.1

(51) Int. Cl.
*H05F 3/00* (2006.01)
(52) U.S. Cl.
USPC ........................................................ 361/215
(58) Field of Classification Search
USPC ........................................................ 361/215
See application file for complete search history.

(56) References Cited

U.S. PATENT DOCUMENTS

| | | | |
|---|---|---|---|
| 3,891,290 A * | 6/1975 | Marshall ........................ | 439/192 |
| 4,985,801 A | 1/1991 | Hellard et al. | |
| 2009/0071676 A1 | 3/2009 | Fernandez Vieria | |
| 2010/0045029 A1* | 2/2010 | Youssef et al. .................. | 285/91 |
| 2010/0122749 A1 | 5/2010 | Bouleti et al. | |
| 2010/0226063 A1 | 9/2010 | West et al. | |

OTHER PUBLICATIONS

British Search Report for 1014699.1 dated Jan. 20, 2011.

* cited by examiner

*Primary Examiner* — Dharti Patel
(74) *Attorney, Agent, or Firm* — Lowe Hauptman & Ham, LLP

(57) ABSTRACT

A pipe connector is disclosed, comprising two connector elements, arranged for interconnection of two pipes, wherein one or both of the connector elements is formed from electrically resistive material so as to provide electrical resistance between the connected pipes.

16 Claims, 5 Drawing Sheets

PIPE CONNECTOR

RELATED APPLICATIONS

The present application is based on, and claims priority from, British Application Number 1014699.1, filed Sep. 6, 2010, the disclosure of which is hereby incorporated by reference herein in its entirety.

FIELD OF INVENTION

The present invention relates to a pipe connector.

BACKGROUND OF THE INVENTION

A significant consideration in the design of an aircraft is the effect on lightning strike. When most of the airframe structure is metallic, lightning current is carried by the primary structure. Since the metallic structure generally has large cross sectional areas, lightning currents are thus not considered to have a significant effect on fuel, hydraulic, electrical and utility duct sub-systems. Fibre-reinforced composites are increasingly commonly used for many aspects of airframe design and manufacture, including structural elements. With composite structures the resistance of the primary structure is significantly higher than an equivalent metallic structure resulting in the traditional metallic tubing or duct systems being the most conductive element in the airframe. In many applications, such as fuel, venting or inerting systems, where flammable fluids or vapours can be present in a pipe run. Thus any electrical arcing resulting from a lightening strike within or around the pipe run will be potentially hazardous and thus must be minimised.

For a typical fuel system made of pipe connectors and pipes, there are two fundamental design approaches to avoid this problem. The first is to use short non-metallic isolator or resistor sections in a largely metallic tubing system to electrically separate the lengths of metallic tubing. An insulating section of pipe may be formed from a polymer such as nylon.

The second approach is to replace part of the metallic tubing system with longer non-metallic sections. In that case, the static charge accumulated on the non-metallic components need to be discharge. The non-metallic section is made of highly resistive material which allows static discharge while limiting lightning current to flow though it. A highly resistive section of pipe may be formed from a composite material loaded with conductive fillers. While it is technically possible to form the entire tubing system from highly resistive material, due to the application of conventional manufacturing and stress approaches, this is not a practical solution and would in any case carry a high cost.

A problem with both if these approaches are that the insulators or isolators are expensive and relatively heavy.

SUMMARY OF THE INVENTION

An embodiment of the invention provides a pipe connector comprising:
a first connector element comprising a hollow body member providing a connection for a first electrically conductive pipe means at one end and first coupling means at the other end;
a second connector element comprising a hollow body member providing a connection for a second electrically conductive pipe means at one end and second coupling means at the other end arranged for coupling with the first coupling means, wherein at least one of the first or second connector elements is formed from electrically resistive material; and
bonding means arranged to enable a predetermined level of electrostatic discharge between the first and second electrically conductive pipe means.

The first connector element only may be formed from the electrically resistive material. The bonding means may be connected between the first and second pipe means. The second connector element only may be formed from the electrically resistive material. The bonding means may be connected between the first pipe means and the second connector element. Both the first and second connector elements may be formed from the electrically resistive material. The bonding means may be connected between the first and second connector elements.

The or each connector element when formed from the electrically resistive material may be fixed to the respective pipe means using electrically conductive fixing means. The first and second connector elements may provide an electrical resistance of at least 500 KW between the first and second electrically conductive pipe means. The connector elements may provide and electrical resistance of at least 1 MW between the first and second electrically conductive pipe means. The electrically resistive material may be an electrically insulating material for providing electrical isolation between the first and second electrically conductive pipe means. The pipe connector may be arranged for use in a fuel system. The pipe connector may be arranged for use in aircraft.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
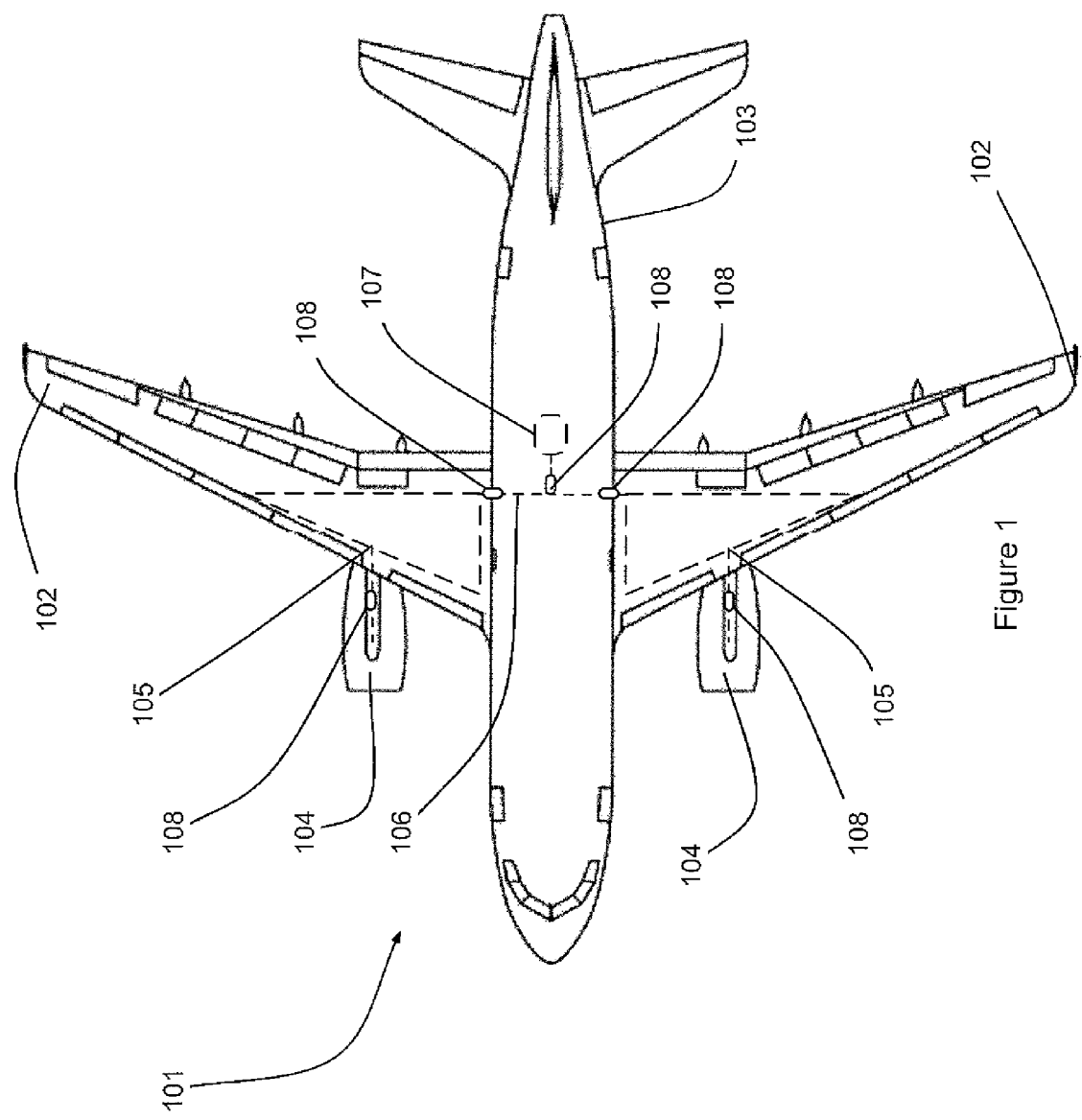
FIG. 1 is a schematic illustration of an aircraft comprising a fuel system.

With reference to FIG. 1, an aircraft 101 comprises a pair of wings 102 faired into a fuselage 103. Each wing 102 carries an engine 104 and an internally located fuel tank 105. The fuel tanks 105 are connected to the engines 104 by a set of metallic fuel lines or pipes 106. The supply of fuel from the fuel tanks 105 to the engines 104 is controlled by a fuel management system 107. The metallic fuel pipes 106 are constructed from a series of lengths of pipes jointed using pipe connectors 108. As will be understood by those skilled in the art, an aircraft may comprise a large number of pipe connectors 108. For clarity, only five pipe connectors are shown in FIG. 1.

Figure 2:
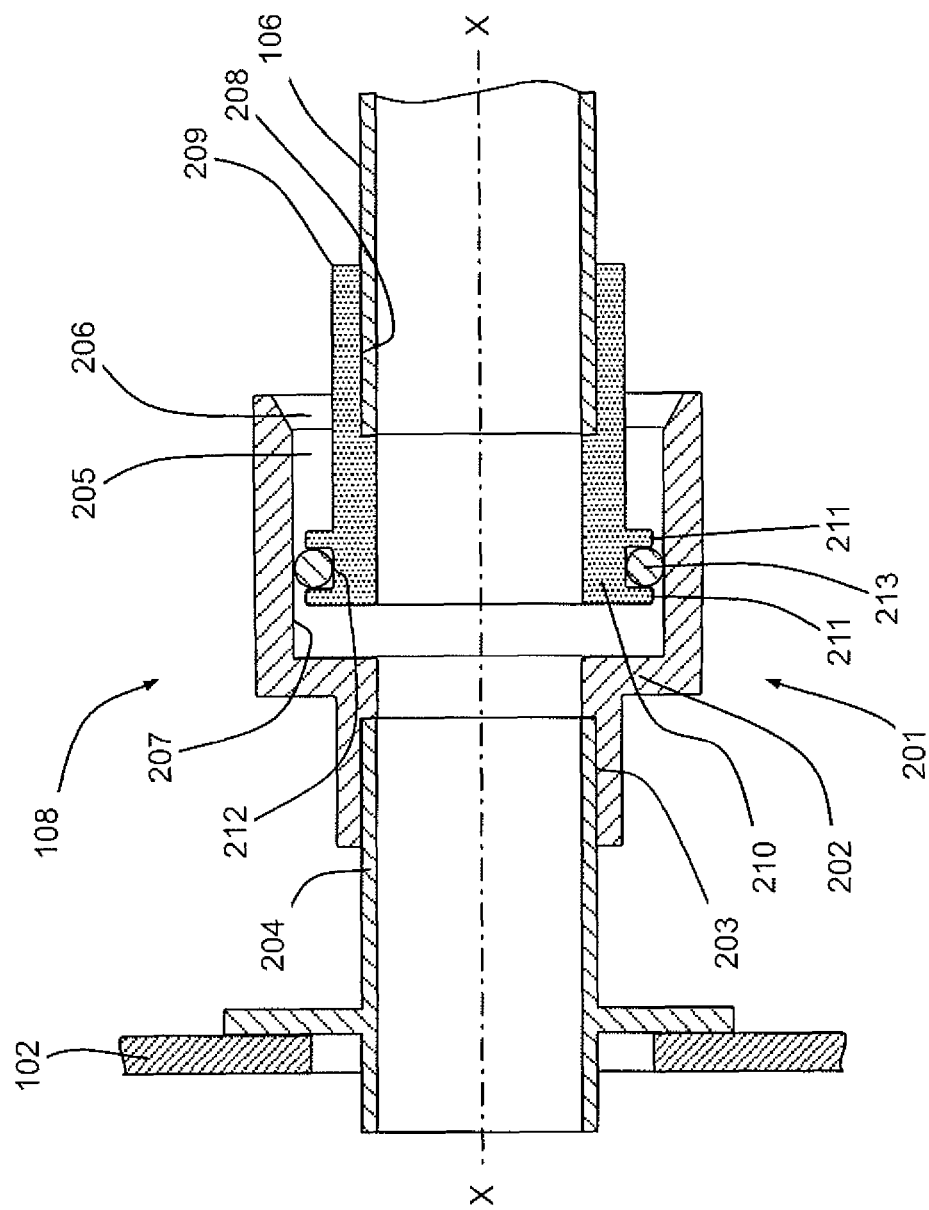
FIG. 2 is cross sectional side view of a pipe connector in the fuel system of FIG. 1.

With reference to FIG. 2, each pipe connectors 108 comprises a metallic female pipe connector element 201 comprising an annular body member 202 having a central axis X that provides an internal space for fuel flow. The body member 202 comprises pipe connection means 203, in the form of a first cylindrical socket, formed at one end. In the present embodiment, a metallic pipe connector body 204 having a corresponding central axis X and providing an internal space for fuel flow is connected to the pipe connection means 203. The pipe connector body 204 comprises a flange that enables the pipe connector body 204 to be fitted to the interior structure of one of the wings 102. The body member 202 further comprises a second cylindrical socket 205 formed at the end opposite to the first socket 203. The second socket 205 has an internally linearly tapered opening 206 that is tapered inwardly towards the central axis X. The internal surface of the socket 205 provides a cylindrical seat 207.

The pipe connector 108 further comprises a male pipe connector element 208 in the form of an annular body member having a central axis X and providing an internal space for fuel flow. The male pipe connector element 208 further comprises pipe connection means 209, in the form of a cylindrical socket, formed at one end, for connecting to a pipe 106. The body member 208 further comprises a cylindrical spigot 210 formed at the end opposite to the socket 209. The spigot 210 further comprises two radial flanges 211 on its outer surface which together form a cylindrical seal seat 212 at the distal end of the spigot 210. An o-ring seal 213 is retained within the seal seat 212. The seal 213 is arranged to provide a fluid-tight seal between cylindrical seat 207 of the second socket 205 of the female pipe connector element 201 and the spigot 210 thus enabling the pipe connector 108 to provide a fuel-tight joint for pipes 106.

In the present embodiment, the male pipe connector element 208 is formed from a non-conductive or isolative material, that is, a material that provides electrical insulation. In the present embodiment, the non-conductive material is polyether ether ketone (PEEK) structurally reinforced with 30% glass fibre. As will be understood by those skilled in the art, other materials such as polyphenylene sulfide (PPS) or nylon reinforced by short glass fibre may also be used depending on the given application. The electrically insulating feature of the male pipe connector element 208 enables the pipe connector 108 to be used in place of a traditional pipe insulator.

Figure 3:
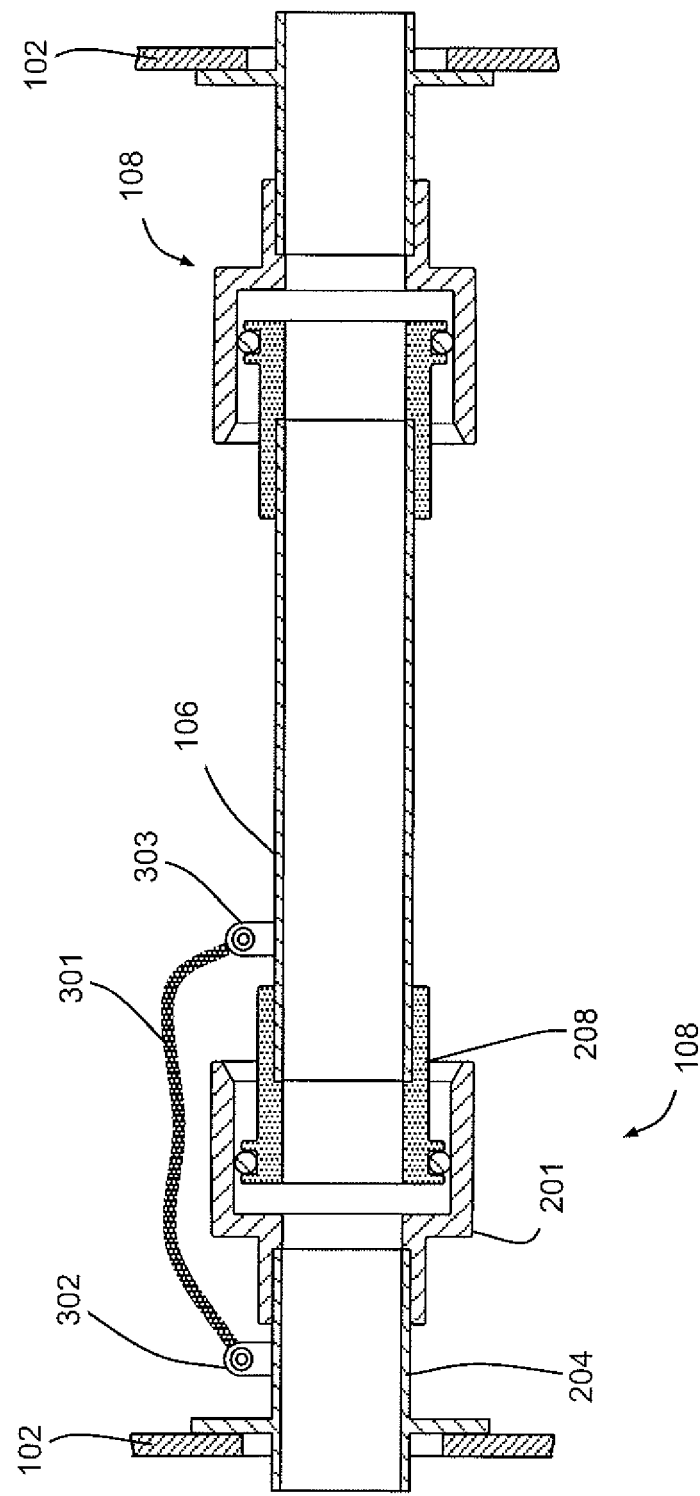
FIG. 3 is cross sectional side view of a fuel pipe and pipe connector assembly in the fuel system of FIG. 1.

FIG. 3 shows two insulating pipe connectors 108 each connecting a pipe connector body 204, fitted to the interior structure of one of the wings 102, to a common pipe element 106. A bonding lead 301 is provided fitted between tabs 302, 303 formed on respective pipe connector body 204 and pipe element 106. The bonding lead 301 is arranged to provide a route for the discharge of static electricity that may build up on the common pipe element 106. For example, the flow of fluid through the common pipe element 106 may cause the build up of a static charge in that pipe element.

Figure 4:
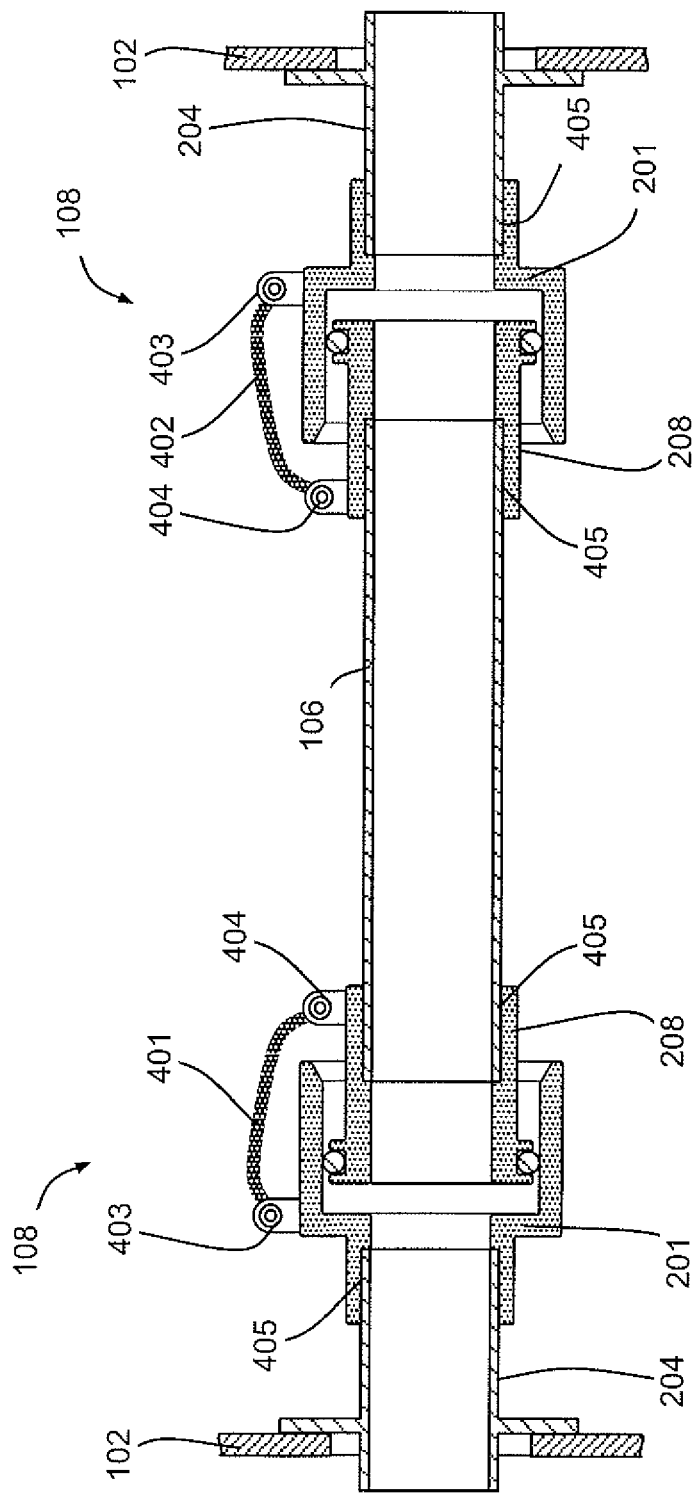
FIG. 4 is a cross sectional side view of a fuel pipe and pipe connector assembly in accordance with another embodiment of the invention.

In another embodiment, with reference to FIG. 4, the male and female pipe connector elements 201, 208 are both formed from a resistive material arranged to provide the pipe connector 108 with a predetermined degree of electrical resistance. In the present embodiment, the resistive material used is thermoplastic PEEK with added conductive filler, in the form of black carbon. As will be understood by those skilled in the art, other conductive fillers such as graphite, short carbon fibres, composite carbon nano tubes or metallic powder such as silver or nickel may be used. The type and proportion of the conductive filler determines the resistivity of the material. As will be understood by those skilled in the art, other thermoplastic materials such as nylon or PPS may be used. Because such PEEK materials with added conductive filler are slightly conductive, they are capable of electrostatic discharge (ESD), that is, of dissipating or conducting static electrical charges.

With further reference to FIG. 4, bonding leads 401, 402 are provided fitted between respective sets of tabs 403, 404 formed on respective female and male connector elements 201, 208. In addition, conductive fixing agent in the form of a conductive adhesive 405 is used for bonding each connector element 201, 208 to the respective pipe connector body 204 and pipe element 106. In the present embodiment, the adhesive 405 comprises an epoxy resin with conductive filler in the form of nickel. The bonding leads 401, 402, in combination with the adhesive 405, are arranged to provide a route for the discharge of static electricity that may build up in the pipe assembly. In the present embodiment, the electrical resistance across each pipe connector 108 is arranged to be within the range of 500 kilo-ohms (KW) and 1 mega-ohm (MW).

Figure 5A:
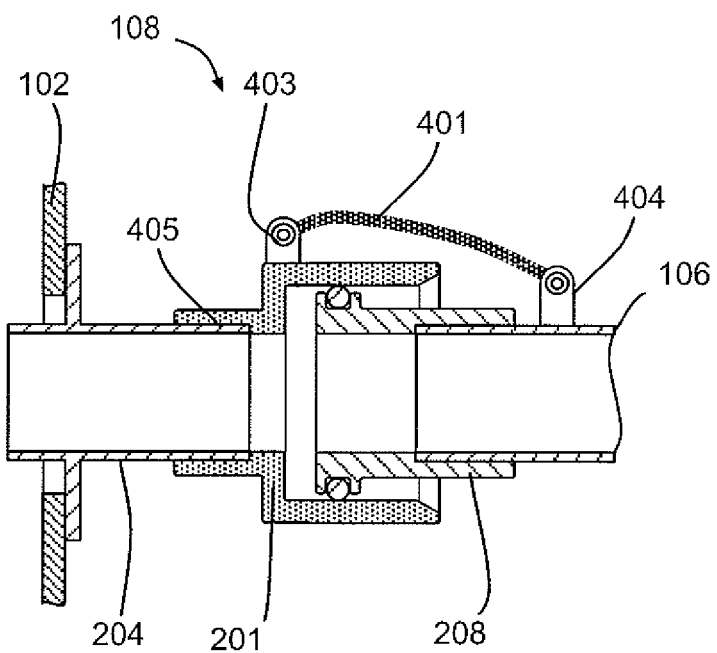
FIGS. 5a & 5b are cross sectional views of pipe connectors in accordance with further embodiments of the invention.

In a further embodiment, with reference to FIG. 5a, only the female connector element 201 is formed from a resistive material such as PEEK with added conductive filler. The male connector element 208 is formed from metal such as aluminium. In the present embodiment, the bonding lead 401 is connected between the common pipe element 106 fixed to the male connector element 208 and the female connector element 201. Furthermore, in the present embodiment, no conductive fixing means is required between the common pipe element 106 and the male connector element 208.

Figure 5B:
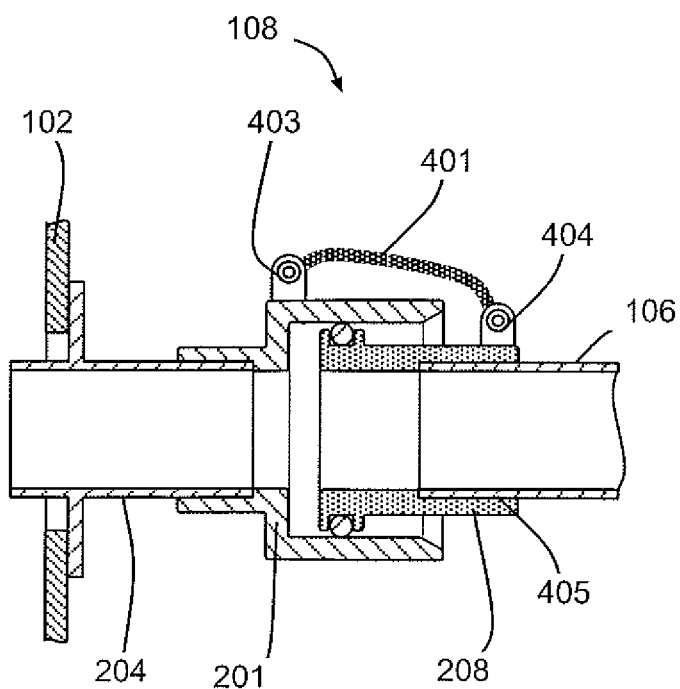

In another embodiment, with reference to FIG. 5b, only the male connector element 208 is formed from a resistive material such as PEEK with added conductive filler. The female connector element 201 is formed from metal such as aluminium. In the present embodiment, the bonding lead 401 is connected between the male connector element 208 and the female connector element 201. Furthermore, in the present embodiment, no conductive fixing means is required between the pipe element 106 and the female connector element 201.

In a further embodiment, with reference to FIG. 2, both the male connector element and the female connector element are formed from an insulating, non-conductive or isolative material. In another embodiment only the female connecter element is formed from an insulating, non-conductive or isolative material.

As will be understood by those skilled in the art, the female connector element 201 may be formed as a single part if the annular body member 202 and the pipe connector body 204 are formed from compatible materials. For example, if the annular body member 202 and the pipe connector body 204 are formed from the same material they can be machined, cast or moulded as a single piece.

As will be understood by those skilled in the art, the pipe connector 108 may be arranged to connect two pipe elements, with the additional pipe element being fixed directly into the annular body member 202 in place of the pipe connector body 204. In other words, the pipe connector may be used to interconnect either a pipe connector body 204 with a pipe element 106, two pipe connector bodies 204 or two pipe elements 106. Therefore, the term pipe means is used herein to refer generally to a pipe connector body 204 or to a pipe element 106.

As will be understood by those skilled in the art, the selection of suitable materials for forming each element of the pipe connector and connected pipe is dependent on the given application as is the level of electrical insulation, conduction, isolation, resistance of the or each relevant pipe connection elements.

As will be understood by those skilled in the art, the pipe connectors described herein may be applied to any suitable pipe installation or system for carrying any suitable substance.

As will be understood by those skilled in the art, where the accumulation, discharge or dissipation of static electrical charge is concerned, consideration needs to be given to the minimum applicable clearance, air gap or tracking distance between conductive elements such as the bonding leads, connection tabs or other related fixings and other conductive fixings so as to avoid possible sparking. The maximum length of non-metallic isolative parts so as to avoid accumulation of static charge also needs to be considered.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the scope of applicant's general inventive concept.

The invention claimed is:

1. A pipe connector comprising:
   a first connector element comprising a hollow body member providing a connection for a first electrically conductive pipe means at one end and first coupling means at the other end;
   a second connector element comprising a hollow body member providing a connection for a second electrically conductive pipe means at one end and second coupling means at the other end arranged for coupling with said first coupling means, wherein at least one of said first or second connector elements is formed from substantially non-metallic material, wherein said substantially non-metallic material is isolative; and
   a bonding element arranged to enable a predetermined level of electrostatic discharge between said first and second electrically conductive pipe means.

2. A pipe connector according to claim 1 in which said first connector element only is formed from said electrically resistive material.

3. A pipe connector according to claim 2 in which said bonding element is connected between said first and second pipe means.

4. A pipe connector according to claim 1 in which said second connector element only is formed from said electrically resistive material.

5. A pipe connector according to claim 4 in which said bonding element is connected between said first pipe means and said second connector element.

6. A pipe connector according to claim 1 in which both said first and second connector elements are formed from said electrically resistive material.

7. A pipe connector according to claim 6 in which said bonding element is connected between said first and second connector elements.

8. A pipe connector according to claim 1, wherein said first or second connector elements is fixed to the respective pipe means using electrically conductive fixing means.

9. A pipe connector according to claim 1 in which said first and second connector elements provide an electrical resistance of at least 500 KW between said first and second electrically conductive pipe means.

10. A pipe connector according to claim 1 in which said connector elements provide and electrical resistance of at least 1 MW between said first and second electrically conductive pipe means.

11. A pipe connector according to claim 1 in which said substantially non-metallic material is an electrically insulating material for providing electrical isolation between said first and second electrically conductive pipe means.

12. A pipe connector according to claim 1 arranged for use in a fuel system.

13. A pipe connector according to claim 1 arranged for use in aircraft.

14. A pipe connector, comprising:
    a first connector element comprising a hollow body member providing a connection for a first electrically conductive pipe means at one end and first coupling means at the other end; and,
    a second connector element comprising a hollow body member providing a connection for a second electrically conductive pipe means at one end and second coupling means at the other end arranged for coupling with said first coupling means, wherein at least one of said first or second connector elements is formed from an electrically insulating material, and wherein said electrically insulating material is isolative.

15. A pipe connector according to claim 14, further comprising a bonding element arranged to enable a predetermined level of electrostatic discharge between said first and second electrically conductive pipe means.

16. A pipe connector, comprising:
    a first connector element comprising a hollow body member providing a connection for a first electrically conductive pipe means at one end and first coupling means at the other end; and
    a second connector element comprising a hollow body member providing a connection for a second electrically conductive pipe means at one end and second coupling means at the other end arranged for coupling with said first coupling means, wherein at least one of said first or second connector elements is formed from an electrically isolative material.

* * * * *